United States Patent
Wu et al.

(10) Patent No.: US 10,655,261 B2
(45) Date of Patent: May 19, 2020

(54) INTELLIGENT LAUNDRY DEVICE AND METHOD THEREFOR

(71) Applicant: Beijing Xiaomi Mobile Software Co., Ltd., Beijing (CN)

(72) Inventors: Ke Wu, Beijing (CN); Xinyu Liu, Beijing (CN); Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 324 days.

(21) Appl. No.: 15/696,668

(22) Filed: Sep. 6, 2017

(65) Prior Publication Data

US 2018/0066389 A1 Mar. 8, 2018

(30) Foreign Application Priority Data

Sep. 8, 2016 (CN) .......................... 2016 1 0811478

(51) Int. Cl.
| | | |
|---|---|---|
| *D06F 33/02* | (2006.01) | |
| *D06F 58/28* | (2006.01) | |
| *G05B 19/048* | (2006.01) | |
| *D06F 33/00* | (2020.01) | |
| *D06F 58/30* | (2020.01) | |
| *D06F 34/28* | (2020.01) | |

(52) U.S. Cl.
CPC .............. *D06F 33/00* (2013.01); *D06F 58/30* (2020.02); *G05B 19/048* (2013.01); *D06F 34/28* (2020.02); *D06F 2202/10* (2013.01); *D06F 2202/12* (2013.01); *D06F 2204/065* (2013.01); *D06F 2220/00* (2013.01); *G05B 2219/2613* (2013.01)

(58) Field of Classification Search
CPC ...... D06F 33/02; D06F 58/28; D06F 2202/10; D06F 2202/12; D06F 2204/065; D06F 2220/00; G05B 19/048; G05B 2219/2613
USPC .............................................. 8/137, 158, 159
See application file for complete search history.

(56) References Cited

U.S. PATENT DOCUMENTS

2012/0090099 A1* 4/2012 Kim ........................ D06F 33/02
8/137

FOREIGN PATENT DOCUMENTS

| CN | 102443998 A | 5/2012 |
|---|---|---|
| CN | 104762787 A | 7/2015 |
| CN | 303579277 S | 3/2016 |

OTHER PUBLICATIONS

Chinese Office Action dated Jan. 17, 2018, in counterpart Chinese Patent Application No. 201610811478.1.
Chinese Office Action dated Sep. 21, 2018, in counterpart Chinese Patent Application No. 201610811478.1.

* cited by examiner

*Primary Examiner* — Levon J Shahinian
(74) *Attorney, Agent, or Firm* — Finnegan, Henderson, Farabow, Garrett & Dunner, L.L.P.

(57) ABSTRACT

An intelligent laundry method and device, the method including: determining a current user of a washing machine; determining washing features of the current user; determining washing parameters for a laundry according to the washing features; and controlling the washing machine to wash the laundry according to the washing parameters.

18 Claims, 16 Drawing Sheets

INTELLIGENT LAUNDRY DEVICE AND METHOD THEREFOR

CROSS-REFERENCE TO RELATED APPLICATIONS

This present application is based upon and claims priority to Chinese Patent Application No. 201610811478.1, filed Sep. 8, 2016, the entire contents of which are incorporated herein by reference.

TECHNICAL FIELD

The present disclosure relates to intelligent device technologies and, more particularly, to an intelligent laundry method and device.

BACKGROUND

Washing machine is an indispensable household appliance in people's daily life. With the development of Internet-of-Things (IoT) technology, intelligent washing machine has emerged and can make the laundry experience more efficient and convenient.

SUMMARY

According to a first aspect of the present disclosure, there is provided an intelligent laundry method, comprising: determining a current user of a washing machine; determining washing features of the current user; determining washing parameters for a laundry according to the washing features; and controlling the washing machine to wash the laundry according to the washing parameters.

According to a second aspect of the present disclosure, there is provide an intelligent laundry device, comprising: a processor; and a memory configured to store instructions executable by the processor; wherein the processor is configured to: determine a current user of a washing machine; determine washing features of the current user; determine washing parameters for a laundry according to the washing features; and control the washing machine to wash the laundry according to the washing parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and constitute a part of this specification, illustrate embodiments consistent with the present disclosure and, together with the description, serve to explain principles of the present disclosure.

DETAILED DESCRIPTION

Reference will be made in detail to explain embodiments of the present disclosure, examples of which are illustrated in the accompanying drawings. The following description refers to the accompanying drawings in which the same numbers in different drawings represent the same or similar elements unless otherwise represented. The implementations set forth in the following description of exemplary embodiments do not represent all embodiments consistent with the present disclosure. Instead, they are merely examples of devices and methods consistent with aspects related to the present disclosure as recited in the appended claims.

Figure 1:
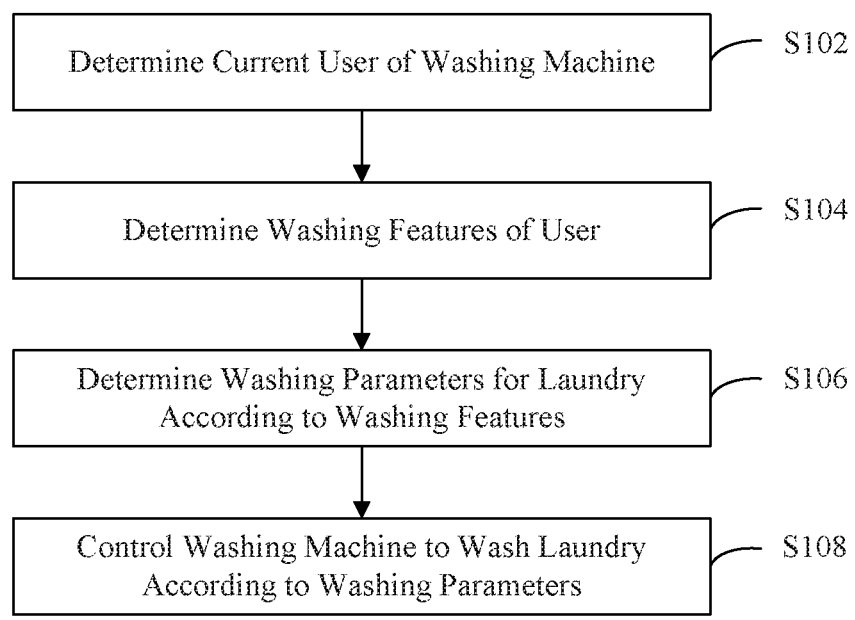
FIG. 1 is a flowchart of an intelligent laundry method, according to an exemplary embodiment.

FIG. 1 is a flowchart of an intelligent laundry method 100, according to an exemplary embodiment. For example, the method 100 may be performed by an intelligent laundry device consistent with the present disclosure. In some embodiments, the intelligent laundry device may be a part of a washing machine. In some embodiments, the intelligent laundry device may be a part or the whole of a terminal in communication with the washing machine. As shown in FIG. 1, the intelligent laundry method 100 includes the following steps.

At step S102, the intelligent laundry device determines a current user of the washing machine.

Specifically, the intelligent laundry device may determine the current user by determining to which user the clothes to be cleaned belong. In a family having multiple members, such as grandfather, grandmother, father, mother, and children, the clothes of different members may be washed separately or may be washed together.

In the technology area of intelligent household appliances, an intelligent household appliance may be connected to a network, such that users can operate the intelligent household appliance through a smartphone, a tablet computer, and so on. Consistent with the disclosed embodiments, the washing machine may be connected to a server in a network, and users may log into the washing machine through an application (APP) installed on a terminal, such as a smartphone. Therefore, in some embodiments, the intelligent laundry device determines the current user of the washing machine according to login information of the user. When a family has multiple members, different members may use different user accounts to log into the washing machine, and the intelligent laundry device can determine the current user of the washing machine according to the user account currently logged into.

In some embodiments, the intelligent laundry device may obtain a list of users currently accessing a home area network, and determine the current user of the washing machine based on the users accessing the home area network. Usually, only family members can access the home area network. Thus, the intelligent laundry device can consider the users accessing the home area network to be family members. When it is determined that there is only one family member, the intelligent laundry device determines this family member as the current user of the washing machine. When it is determined that there are multiple family members, the intelligent laundry device may generate a message prompting the current user of the washing machine to make a selection among the family members. When the user selects a family member, the intelligent laundry device determines that the selected family member is the current user of the washing machine. In some embodiments, the intelligent laundry device may treat the whole family as a single user. For example, the intelligent laundry device may teat a family consisting of father, mother, and children as a single user. As another example, the intelligent laundry device may treat a family consisting of elders and adults as another single user.

In some embodiments, a camera may be installed on the washing machine or other places in a house to capture images of users permitted to use the washing machine, e.g., members of a family living in the house. The intelligent laundry device may determine the users permitted to use the washing machine (e.g., family members) according to the image data generated by the camera, and further determine the current user of the washing machine from the users permitted to use the washing machine.

For example, when the intelligent laundry device determines that a family only has one member according to the image data generated by the camera, the intelligent laundry device determines the only family member to be the current user of washing machine. However, when the intelligent laundry device determines there are multiple family members according to the image data, the intelligent laundry device needs to employ a method to select the current user of the washing machine from the multiple family members. In one embodiment, the intelligent laundry device may generate a message prompting the current user to make a selection among the multiple family members, and determine the user-selected family member to be the current user of the washing machine. In another embodiment, the intelligent laundry device may determine the current user of the washing machine according to supplemental information such as the colors and sizes of the clothes currently loaded in the washing machine. For example, the camera may be configured to take images of the clothes loaded in the washing machine and the intelligent laundry device may determine the colors and sizes of the clothes based on the image data generated by the camera. Based on colors and sizes of the clothes, the intelligent laundry device may further determine whether the clothes belong to an adult user or a child user, a male user or a female user, etc. Combining this information (e.g., adult, child, female, male, etc.) with information of the family members, the intelligent laundry device may automatically ascertain the current user of the washing machine. Such determining process does not require participation of the user, which is more intelligent and convenient.

At step S104, the intelligent laundry device determines washing features of the user.

Different users may have different washing features. The washing features of a user include one or more of a laundry duration, a quantity of the laundry, a weight of the laundry, types of clothes to be cleaned, material of the clothes to be cleaned, a degree of dirtiness of the clothes to be cleaned, and a cleanliness requirement of the laundry. For example, the types of the clothes to be cleaned may include casual clothes, suits, shirts, and so on. The material of the clothes to be cleaned may include silk, cotton, wool, and so on. The degree of dirtiness of the clothes to be cleaned may be divided into several levels, such as "very dirty," "dirty," and "clean." The cleanliness requirement of the laundry may also be divided into several levels, such as high cleanliness requirement and average cleanliness requirement. Usually, female and child users may require a high cleanliness of the laundry, while male users may only require an average cleanliness of the laundry.

The intelligent laundry device may determine or generate the washing features in various manners. In one embodiment, if a user has used the washing machine previously, the intelligent laundry device may generate washing features of the user according to washing records of the user. A washing record may include types of clothes in a previous laundry performed by the user, material of the clothes in the previous laundry, a degree of dirtiness of the clothes in the previous laundry, and a cleanliness requirement of the previous laundry. In another embodiment, the intelligent laundry device may detect features related to the clothes to be cleaned by a user, and determine the washing features of the user according to the detecting result. In another embodiment, for a new user who is using the washing machine for the first time, the intelligent laundry device may determine the washing features of the new user according to user features, such as gender and the age, of the new user, and a pre-established correspondence relationship between the user features (e.g., gender, age, etc.) and the washing features. In yet another embodiment, the intelligent laundry device may generate a user's washing features according to washing records of the user's family members. For example, the intelligent laundry device may apply the same or similar washing features for members in the same family.

At step S106, the intelligent laundry device determines washing parameters for a laundry according to the washing features of the user.

The washing parameters are settings of the washing machine and may include, but are not limited to, a rotating speed of the washing machine, a washing cycle duration, and a number of rinse cycles. In the disclosed embodiments, different washing features correspond to different washing parameters.

Next, for illustrative purpose only, an exemplary method for determining the washing parameters of a laundry is provided, assuming the washing features include at least a laundry duration, a quantity of the laundry, and a weight of the laundry.

Specifically, the intelligent laundry device determines whether the laundry duration, the quantity of the laundry, and the weight of the laundry satisfy a first condition. The intelligent laundry device determines the first condition is satisfied when it is determined that the laundry duration is longer than a first threshold, the quantity of the laundry is more than a second threshold, and the weight of the laundry is higher than a third threshold. Here, the first threshold, the second threshold, and the third threshold are preset values associated with the laundry duration, the quantity of the laundry, and the weight of the laundry, respectively.

When the laundry duration, the quantity of the laundry, and the weight of the laundry satisfy the first condition, the intelligent laundry device determines that the washing parameters include a first rotating speed, a first washing cycle duration, and a first number of rinse cycles. When the laundry duration, the quantity of the laundry, and the weight of the laundry do not satisfy the first condition, the intelligent laundry device determines that the washing parameters include a second rotating speed, a second washing cycle duration, and a second number of rinse cycles. In one embodiment, the first rotating speed is higher than the second rotating speed, the first washing cycle duration is longer than the second washing cycle duration, and the first number of rinse cycles is greater than the second number of rinse cycles.

In addition, when the washing features include material of the clothes to be cleaned, the intelligent laundry device may determine the washing parameters for the laundry according to the following method. Specifically, when the material of the clothes to be cleaned includes silk and/or wool, the intelligent laundry device may determine that the washing parameters include a third rotating speed, a third washing cycle duration, and a third number of rinse cycles. When the material of the clothes to be cleaned includes cotton, the intelligent laundry device may determine that the washing parameters include a fourth rotating speed, a fourth washing cycle duration, and a fourth number of rinse cycles. Here, the third rotating speed is higher than the fourth rotating speed, the third washing cycle duration is longer than the fourth washing cycle duration, and the third number of rinse cycles is greater than the fourth number of rinse cycles. This is because silk and wool are soft material, for which a low rotating speed and a long washing cycle duration are desired.

In addition, when the washing features include a cleanliness requirement, the intelligent laundry device may select longer washing cycle durations and higher numbers of rinse cycles for users with a higher cleanliness requirement.

In addition, when washing features include types of the clothes to be cleaned, the intelligent laundry device may determine the washing parameters according to the types of the clothes. For example, since suits and shirts are usually worn in the office and have a high cleanliness requirement, the intelligent laundry device may select a long washing cycle duration and a high number of rinse cycles for them. Moreover, since a high rotating speed may deform delicate clothes, the intelligent laundry device may select a low rotating speed for suits and shirts. In contrast, for casual clothes and other clothes, the intelligent laundry device may select a high rotating speed, a moderate washing cycle duration, and an average number of rinse cycles.

In addition, when the washing features include a degree of dirtiness of the clothes to be cleaned. The intelligent laundry device may select different rotating speeds, washing cycle durations, and numbers of rinse cycles for different degrees of dirtiness. For example, when the clothes to be cleaned has a higher degree of dirtiness, the intelligent laundry device may select a higher rotating speed, a longer washing cycle duration, and/or a greater number of rinse cycles.

The above examples of determining the washing parameters are for illustrative purpose only and do not exhaust the ways of determining the washing parameters based on washing features of a user.

At step S108, the intelligent laundry device controls the washing machine to wash the laundry according to the washing parameters.

The above-described intelligent laundry method 100 can use different washing parameters for different users, and the process of determining the washing parameters is automatically performed by the intelligent laundry device, without requiring user participation. Thus, the method 100 makes the laundry process more intelligent and convenient.

Figure 2:
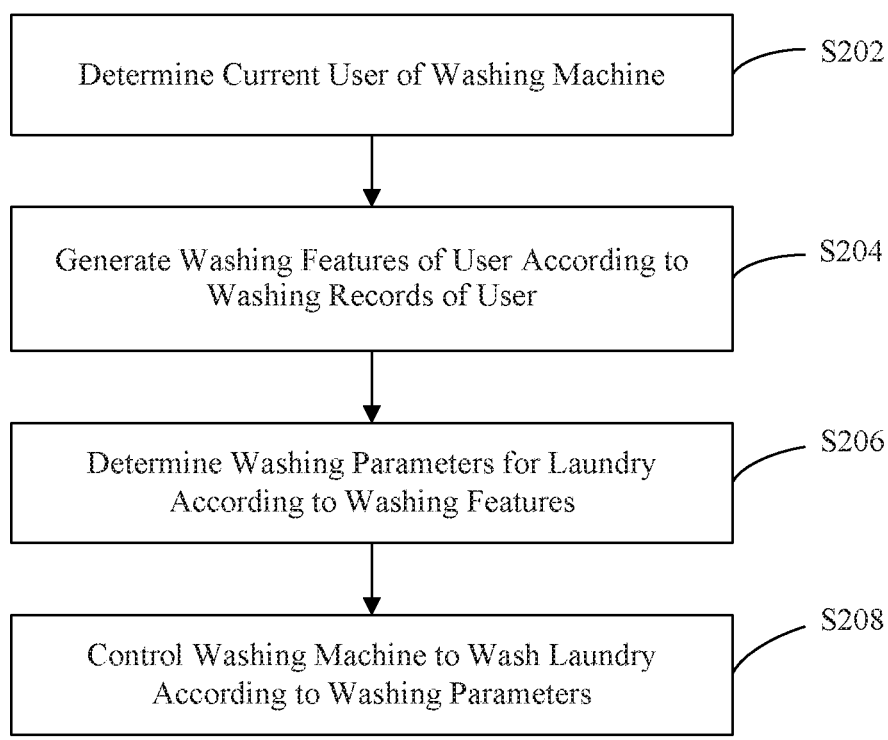
FIG. 2 is a flowchart of an intelligent laundry method, according to an exemplary embodiment.

FIG. 2 is a flowchart of an intelligent laundry method 200, according to an exemplary embodiment. For example, the method 200 may be performed by an intelligent laundry device consistent with the present disclosure. In some embodiments, the intelligent laundry device may be a part of a washing machine. In some embodiments, the intelligent laundry device may be a part or the whole of a terminal in communication with the washing machine. As shown in FIG. 2, the intelligent laundry method 200 includes the following steps.

At step S202, the intelligent laundry device determines a current user of the washing machine. Step S202 is similar to step S102.

At step S204, if the user has used the washing machine previously, the intelligent laundry device generates washing features of the user according to washing records of the user.

The washing features of the user include one or more of a laundry duration, a quantity of the laundry, a weight of the laundry, types of clothes to be cleaned, material of the clothes to be cleaned, a degree of dirtiness of the clothes to be cleaned, and a cleanliness requirement of the laundry. When the user uses the washing machine, the washing machine may generate a washing record. The washing record includes the identity of the user using the washing machine, the laundry duration, the quantity of the laundry, the weight of the laundry, the material of the clothes washed, the type of the clothes washed, the degree of dirtiness of the clothes before washing, and the cleanliness requirement set by the user. Subsequently, the intelligent laundry device can use the washing record to generate washing features of the user.

At step S206, the intelligent laundry device determines washing parameters for a laundry according to the washing features. Step S206 is similar to step S106.

At step S208, the intelligent laundry device controls the washing machine to wash the laundry according to the washing parameters. Step S208 is similar to step S108.

Figure 3:
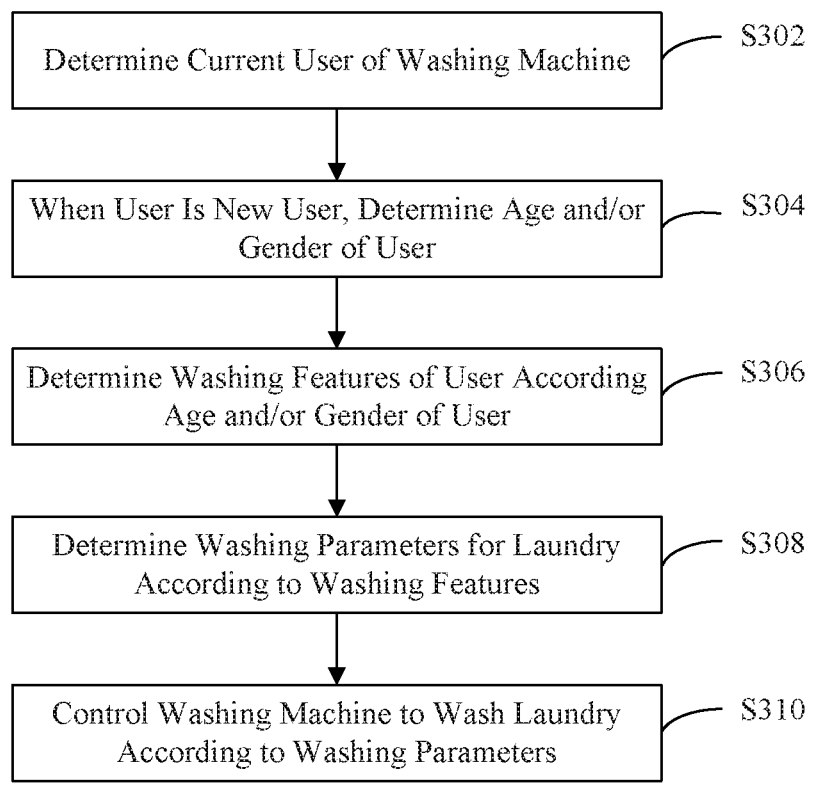
FIG. 3 is a flowchart of an intelligent laundry method, according to an exemplary embodiment.

FIG. 3 is a flowchart of an intelligent laundry method 300, according to an exemplary embodiment. For example, the method 300 may be performed by an intelligent laundry device consistent with the present disclosure. In some embodiments, the intelligent laundry device may be a part of a washing machine. In some embodiments, the intelligent laundry device may be a part or the whole of a terminal in communication with the washing machine. As shown in FIG. 3, the intelligent laundry method 300 includes the following steps.

At step S302, the intelligent laundry device determines a current user of the washing machine. Step S302 is similar to step S102.

At step S304, when the user is a new user of the washing machine, the intelligent laundry device determines an age and/or a gender of the user.

A new user is a user who has not used the washing machine before, and thus no washing records of the user is stored in the washing machine. As such, the intelligent laundry device cannot generate washing features of the user according to washing records. Instead, the intelligent laundry device may obtain the age and/or gender of the user, and determine the washing features of the user according to the age and/or gender of the user. The age and/or gender of the user can be manually inputted by the user via an APP installed on a terminal, or can be estimated by the intelligent laundry device according to images of the user collected by a camera.

At step S306, the intelligent laundry device determines washing features of the user according to the age and/or gender of the user.

In some embodiments, the intelligent laundry device may store a correspondence relationship between user ages and/or user genders and washing features. When a new user uses the washing machine, the intelligent laundry device may determine the washing features of the user according to the age and/or gender of the user and the pre-stored correspondence relationship. The correspondence relationship may be obtained by performing big-data analysis on the washing features of a large number of users.

At step S308, the intelligent laundry device determines washing parameters for a laundry according to the washing features. Step S308 is similar to step S106.

At step S310, the intelligent laundry device controls the washing machine to wash the laundry according to the washing parameters. Step S310 is similar to step S108.

Figure 4:
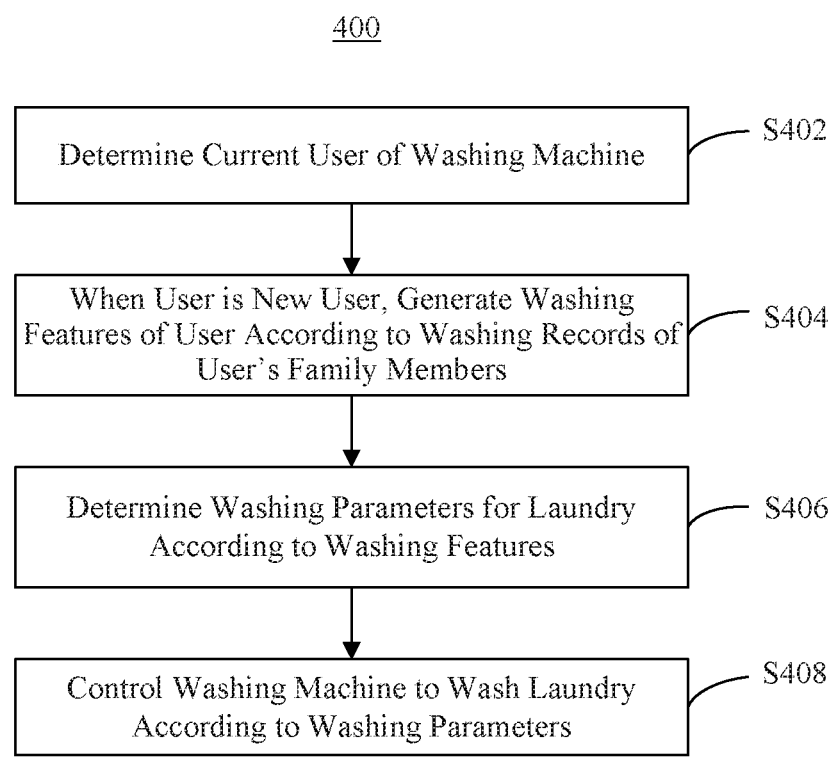
FIG. 4 is a flowchart of an intelligent laundry method, according to an exemplary embodiment.

FIG. 4 is a flowchart of an intelligent laundry method 400, according to an exemplary embodiment. For example, the method 400 may be performed by an intelligent laundry device consistent with the present disclosure. In some embodiments, the intelligent laundry device may be a part of washing machine. In some embodiments, the intelligent laundry device may be a part or the whole of a terminal in communication with the washing machine. As shown in FIG. 4, the intelligent laundry method 400 includes the following steps.

At step S402, the intelligent laundry device determines a current user of the washing machine. Step S402 is similar to step S102.

At step S404, when the user is a new user of the washing machine, the intelligent laundry device generates washing features of the user according to washing records of the user's family members.

Since members of a family may have the same or similar washing features, the intelligent laundry device may generate the washing features of a new user according to washing records of the new user's family members. For example, the intelligent laundry device may determine average values of the laundry duration, the quantity of laundry, and the weight of laundry used by multiple family members of the new user and use the average values as the new user's washing features. Moreover, when most of the family members have a high cleanliness requirement, the intelligent laundry device may determine that the cleanliness requirement of the new user is also high. Moreover, the intelligent laundry device may determine the degree of dirtiness of the new user's clothes according to the degree of dirtiness associated with other family members of the same gender. For example, when the degree of dirtiness associated with other family members of the same gender is "dirty," the intelligent laundry device determines that the degree of dirtiness of the new user's clothes is also "dirty." Moreover, the intelligent laundry device may determine the material of the new user's clothes according to the material of clothes used by most of the other family members. For example, assuming the new user has three other family members, if the washing features of the other family members indicate that each of the three family members washed clothes made of cotton and/or wool while only one of the three family members washed clothes made of silk, the intelligent laundry device may determine that the material of the clothes associated with the new user includes cotton and/or wool. Moreover, the intelligent laundry device may set the new user's type of clothes to be cleaned the same as the type of clothes to be cleaned associated with other family members of the same gender.

At step S406, the intelligent laundry device determines washing parameters for a laundry according to the washing features. Step S406 is similar to step S106.

At step S408, the intelligent laundry device controls the washing machine to wash the laundry according to the washing parameters. Step S408 is similar to step S108.

Figure 5:
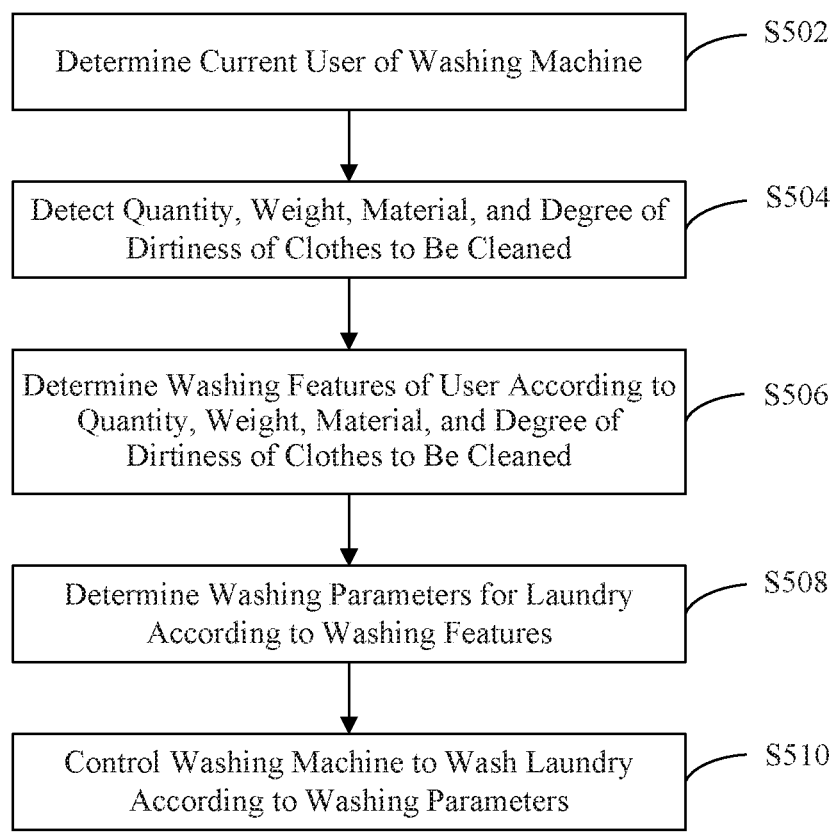
FIG. 5 is a flowchart of an intelligent laundry method, according to an exemplary embodiment.

FIG. 5 is a flowchart of an intelligent laundry method 500, according to an exemplary embodiment. For example, the method 500 may be performed by an intelligent laundry device consistent with the present disclosure. In some embodiments, the intelligent laundry device may be a part of a washing machine. In some embodiments, the intelligent laundry device may be a part or the whole of a terminal in communication with the washing machine. As shown in FIG. 5, the intelligent laundry method 500 includes the following steps.

At step S502, the intelligent laundry device determines a current user of the washing machine. Step S502 is similar to step S102.

At step S504, the intelligent laundry device detects a quantity, a weight, material, and a degree of dirtiness of clothes to be cleaned.

In some embodiments, the intelligent laundry device may detect the quantity, the material, and the degree of dirtiness of the clothes to be cleaned based on analysis of image data collected by a camera. Specifically, when the user loads the laundry into the washing machine, the user usually puts the garments to be cleaned into the washing machine one by one. During this process, a camera on the washing machine can take an image of each piece of clothing (i.e., each garment to be cleaned). The intelligent laundry device may then determine the quantity, the material, and the degree of dirtiness of the clothes to be cleaned according to the image data generated by the camera.

In the disclosed embodiments, the intelligent laundry device may also determine the material and the degree of dirtiness of the clothes to be cleaned by other means. For example, the intelligent laundry device may determine the material and the degree of dirtiness based on spectral analysis of the clothes to be cleaned. Different clothing materials emit different lights (i.e., light signals with different frequencies). As such, the intelligent laundry device may determine the material of the clothes to be cleaned according to the light emitted from the clothes. Moreover, for the same piece of clothing, the light emitted from clean spots and grease spots of the clothing may vary. Thus, the intelligent laundry device may also determine the degree of dirtiness of the clothes based on the light emitted from the clothes. In addition, the intelligent laundry device may determine the weight of the clothes to be cleaned based on measurements by a gravity sensor installed in the washing machine.

At step S506, the intelligent laundry device determines washing features of the user according to the quantity, the weight, the material, and the degree of dirtiness of the clothes to be cleaned.

At step S508, the intelligent laundry device determines washing parameters for a laundry according to the washing features. Step S508 is similar to step S106.

At step S510, the intelligent laundry device controls the washing machine to wash the clothes according to the washing parameters. Step S510 is similar to step S108.

Figure 6:
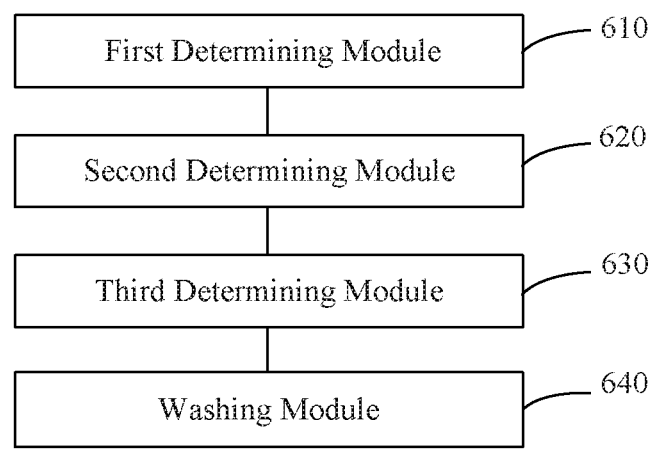
FIG. 6 is a block diagram of an intelligent laundry device, according to an exemplary embodiment.

FIG. 6 is a block diagram of an intelligent laundry device 600, according to an exemplary embodiment. As shown in FIG. 6, the intelligent laundry device 600 includes a first determining module 610, a second determining module 620, a third determining module 630, and a washing module 640.

The first determining module 610 is configured to determine a current user of a washing machine. The second determining module 620 is configured to determine washing features of the user. The third determining module 630 is configured to determine washing parameters for a laundry according to the washing features. The washing module 640 is configured to control the washing machine to wash the laundry according to the washing parameters.

In some embodiments, the washing features of the user include one or more of a laundry duration, a quantity of the laundry, a weight of the laundry, types of clothes to be cleaned, material of the clothes to be cleaned, a degree of dirtiness of the clothes to be cleaned, and a cleanliness requirement of the laundry.

In some embodiments, the washing parameters include a rotating speed of the washing machine, a washing cycle duration, and a number of rinse cycles.

Figure 7:
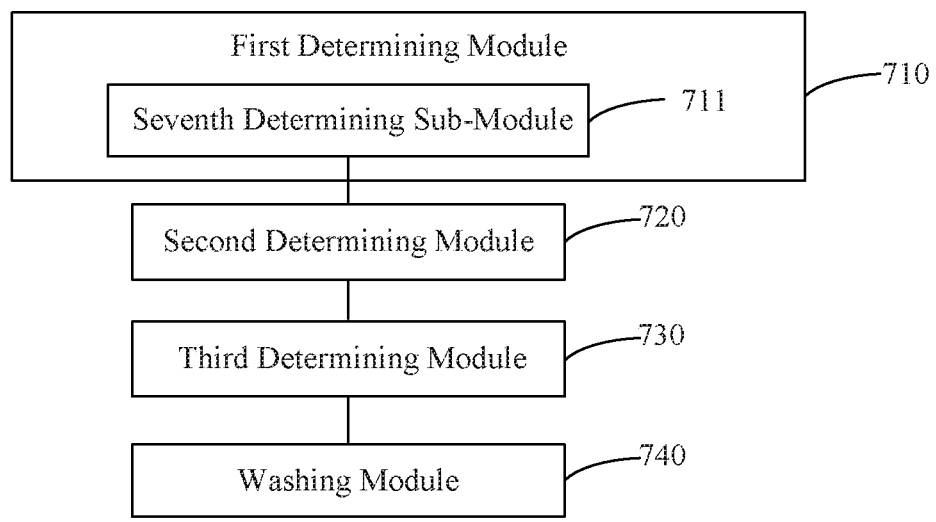
FIG. 7 is a block diagram of an intelligent laundry device, according to an exemplary embodiment.

FIG. 7 is a block diagram of an intelligent laundry device 700, according to an exemplary embodiment. As shown in FIG. 7, the intelligent laundry device 700 includes a first determining module 710, a second determining module 720, a third determining module 730, and a washing module 740, similar to the first determining module 610, the second determining module 620, the third determining module 630, and the washing module 640, respectively (FIG. 6). Additionally, the first determining module 710 includes a seventh determining sub-module 711 configured to determine the current user according to user login information.

Figure 8:
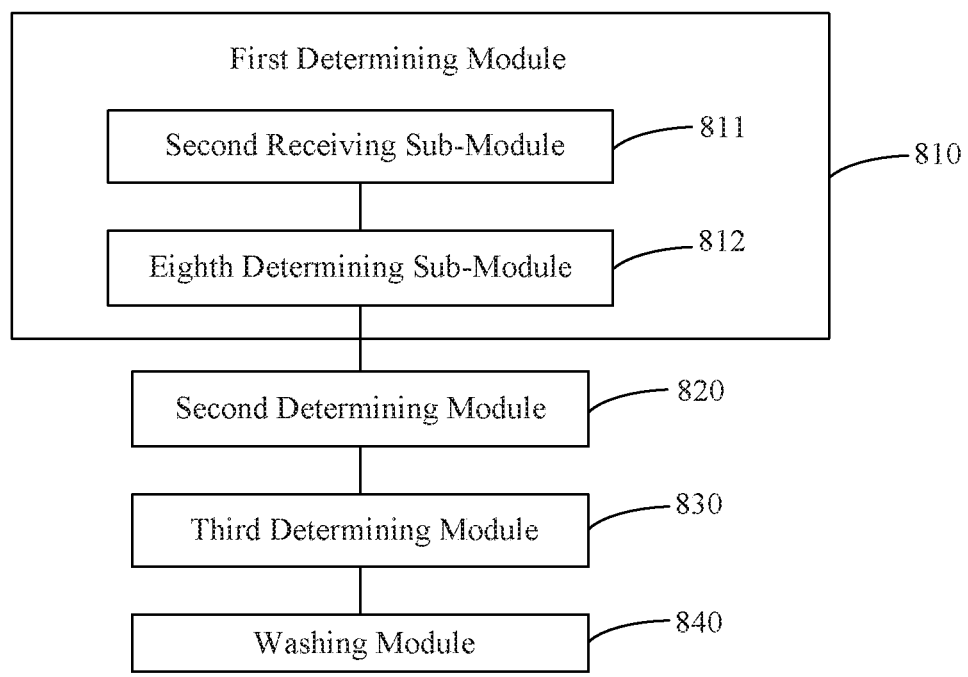
FIG. 8 is a block diagram of an intelligent laundry device, according to an exemplary embodiment.

FIG. 8 is a block diagram of an intelligent laundry device 800, according to an exemplary embodiment. As shown in FIG. 8, the intelligent laundry device 800 includes a first determining module 810, a second determining module 820, a third determining module 830, and a washing module 840, similar to the first determining module 610, the second determining module 620, the third determining module 630, and the washing module 640, respectively (FIG. 6). Additionally, the first determining module 810 includes a second receiving sub-module 811 and an eighth determining sub-module 812.

The second receiving sub-module 811 is configured to determine users accessing a home area network.

The eighth determining sub-module 812 is configured to determine the current user of the washing machine based on the users accessing the home area network.

Figure 9:
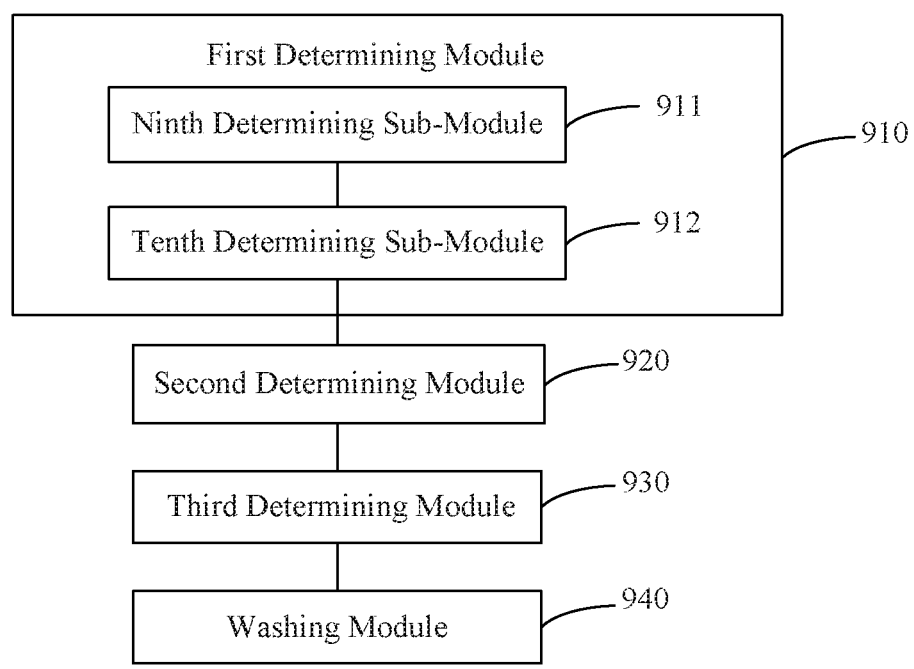
FIG. 9 is a block diagram of an intelligent laundry device, according to an exemplary embodiment.

FIG. 9 is a block diagram of an intelligent laundry device 900, according to an exemplary embodiment. As shown in FIG. 9, the intelligent laundry device 900 includes a first determining module 910, a second determining module 920, a third determining module 930, and a washing module 940, similar to the first determining module 610, the second determining module 620, the third determining module 630, and the washing module 640, respectively (FIG. 6). Additionally, the first determining module 910 includes a ninth determining sub-module 911 and a tenth determining sub-module 912.

The ninth determining sub-module 911 is configured to determine users permitted to use the washing machine (e.g., members of a family) according to image data generated by a camera.

The tenth determining sub-module 912 is configured to determine the current user of the washing machine based on the users permitted to use the washing machine.

Figure 10:
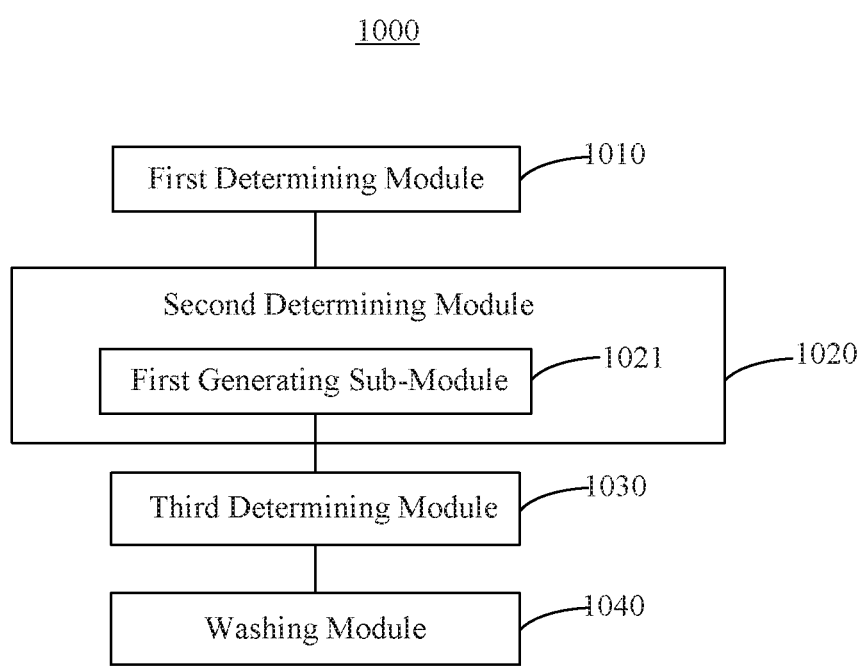
FIG. 10 is a block diagram of an intelligent laundry device, according to an exemplary embodiment.

FIG. 10 is a block diagram of an intelligent laundry device according to an exemplary embodiment. As shown in FIG. 10, the intelligent laundry device 1000 includes a first determining module 1010, a second determining module 1020, a third determining module 1030, and a washing module 1040, similar to the first determining module 610, the second determining module 620, the third determining module 630, and the washing module 640, respectively (FIG. 6). Additionally, the second determining module 1020 further includes a first generating sub-module 1021 configured to generate the washing features of the user according to washing records of the user, when the user has used the washing machine previously.

Figure 11:
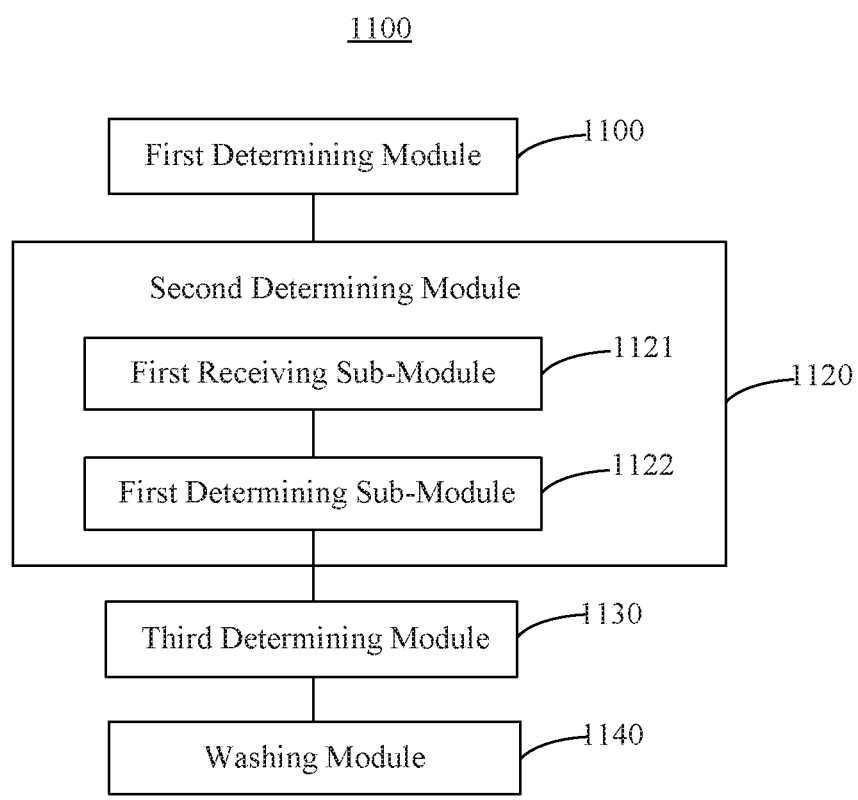
FIG. 11 is a block diagram of an intelligent laundry device, according to an exemplary embodiment.

FIG. 11 is a block diagram of an intelligent laundry device 1100, according to an exemplary embodiment. As shown in FIG. 11, the intelligent laundry device 1100 includes a first determining module 1110, a second determining module 1120, a third determining module 1130, and a washing module 1140, similar to the first determining module 610, the second determining module 620, the third determining module 630, and the washing module 640, respectively (FIG. 6). Additionally, the second determining module 1120 includes a first receiving sub-module 1121 and a first determining sub-module 1122.

The first receiving sub-module 1121 is configured to obtain an age and/or a gender of the user, when the user is a new user.

The first determining sub-module 1122 is configured to determine the washing features of the user according to the age and/or the gender of the user.

Figure 12:
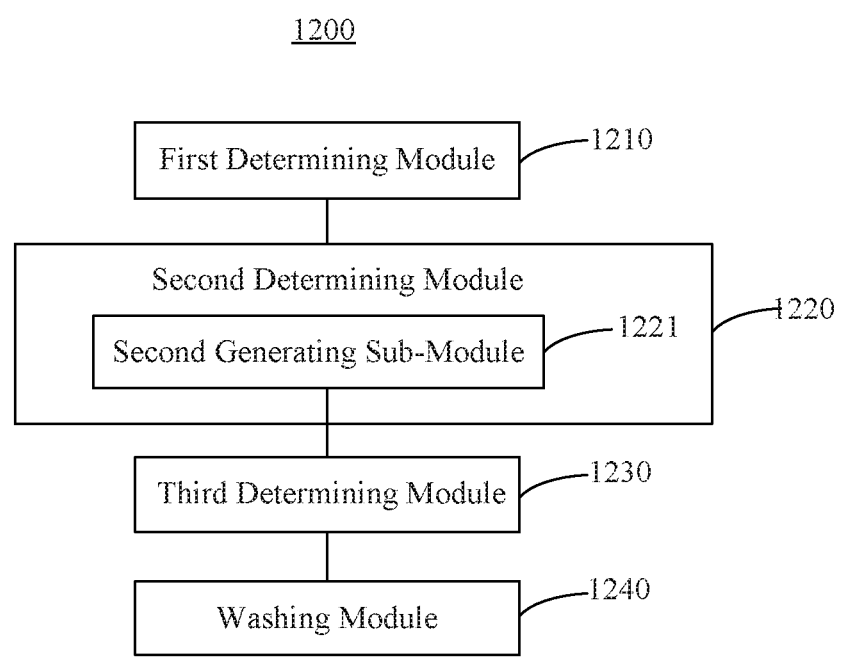
FIG. 12 is a block diagram of an intelligent laundry device, according to an exemplary embodiment.

FIG. 12 is a block diagram of an intelligent laundry device 1200, according to an exemplary embodiment. As shown in FIG. 12, the intelligent laundry device 1200 includes a first determining module 1210, a second determining module 1220, a third determining module 1230, and a washing module 1240, similar to the first determining module 610, the second determining module 620, the third determining module 630, and the washing module 640, respectively (FIG. 6). Additionally, the second determining module 1220 includes a second generating sub-module 1221 configured to determine the washing features of the user based on washing records of the user's family members, when the user is a new user.

Figure 13:
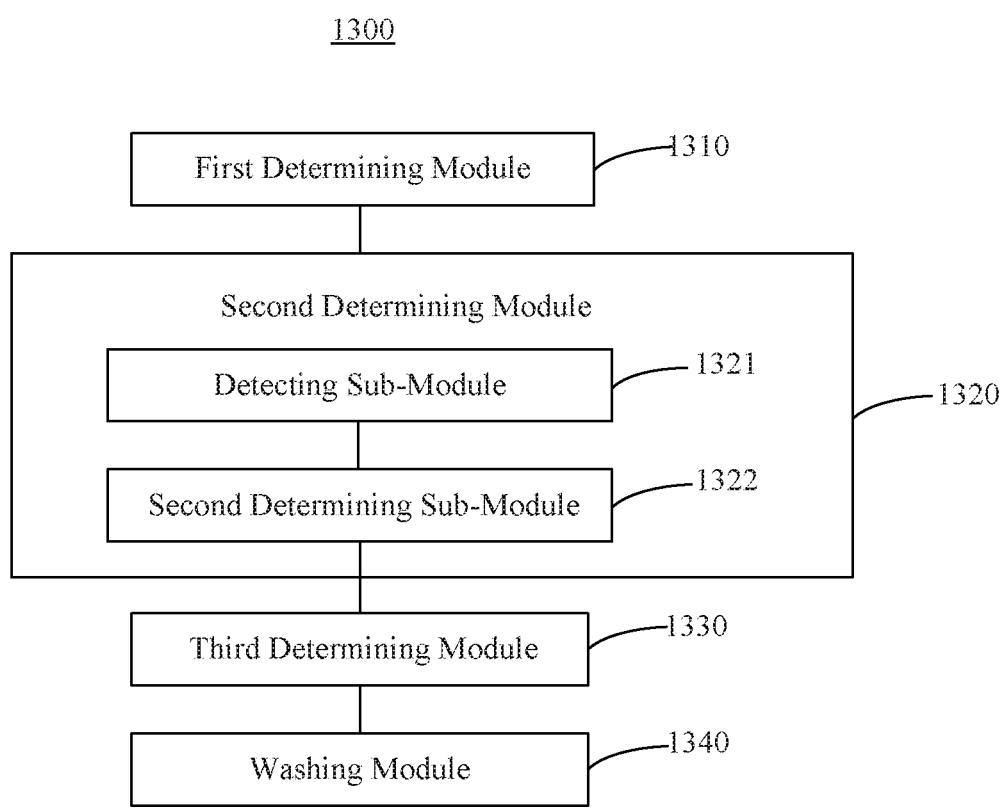
FIG. 13 is a block diagram of an intelligent laundry device, according to an exemplary embodiment.

FIG. 13 is a block diagram of an intelligent laundry device 1300, according to an exemplary embodiment. As shown in FIG. 13, the intelligent laundry device 1300 includes a first determining module 1310, a second determining module 1320, a third determining module 1330, and a washing module 1340, similar to the first determining module 610, the second determining module 620, the third determining module 630, and the washing module 640, respectively (FIG. 6). Additionally, the second determining module 1320 includes a detecting sub-module 1321 and a second determining sub-module 1322.

The detecting sub-module 1321 is configured to detect a quantity, a weight, material, and/or a degree of dirtiness of the clothes to be cleaned.

The second determining sub-module 1322 is configured to determine the washing features of the user according to the quantity, the weight, the material, and/or the degree of dirtiness.

Figure 14:
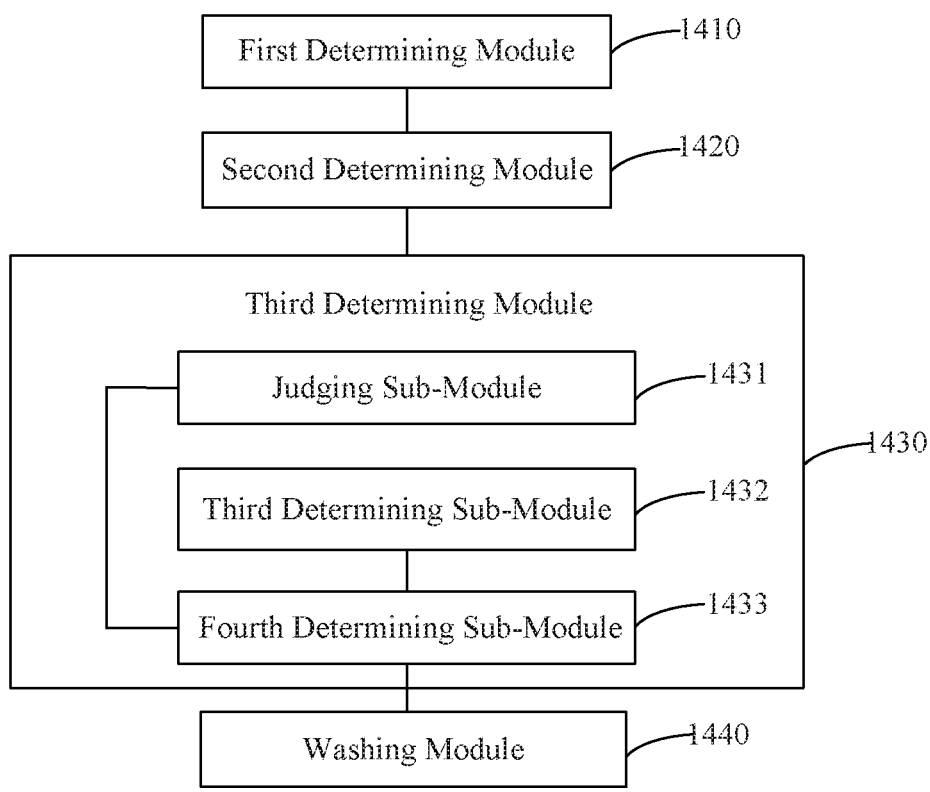
FIG. 14 is a block diagram of an intelligent laundry device, according to an exemplary embodiment.

FIG. 14 is a block diagram of an intelligent laundry device 1400, according to an exemplary embodiment. As shown in FIG. 14, the intelligent laundry device 1400 includes a first determining module 1410, a second determining module 1420, a third determining module 1430, and a washing module 1440, similar to the first determining module 610, the second determining module 620, the third determining module 630, and the washing module 640, respectively (FIG. 6). Additionally, the third determining module 1430 includes a judging sub-module 1431, a third determining sub-module 1432 and a fourth determining sub-module 1433.

The judging module 1431 is configured to determine whether the laundry duration, the quantity of the laundry, and the weight of the laundry satisfy a first condition. Here, the first condition is satisfied when the laundry duration is longer than a first threshold, the quantity of the laundry is more than a second threshold, and the weight of the laundry is greater than a third threshold.

The third determining sub-module 1432 is configured to determine that the washing parameters include a first rotating speed, a first washing cycle duration, and a first number of rinse cycles, when the laundry duration, the quantity of the laundry, and the weight of the laundry satisfy the first condition.

The fourth determining sub-module 1433 is configured to determine that the washing parameters include a second rotating speed, a second washing cycle duration, and a second number of rinse cycles, when the laundry, the quantity of the laundry, and the weight of the laundry do not satisfy the first condition. Here, the first rotating speed is higher than the second rotating speed. The first washing cycle duration is longer than the second washing cycle duration. The first number of rinse cycles is greater than the second number of rinse cycles.

Figure 15:
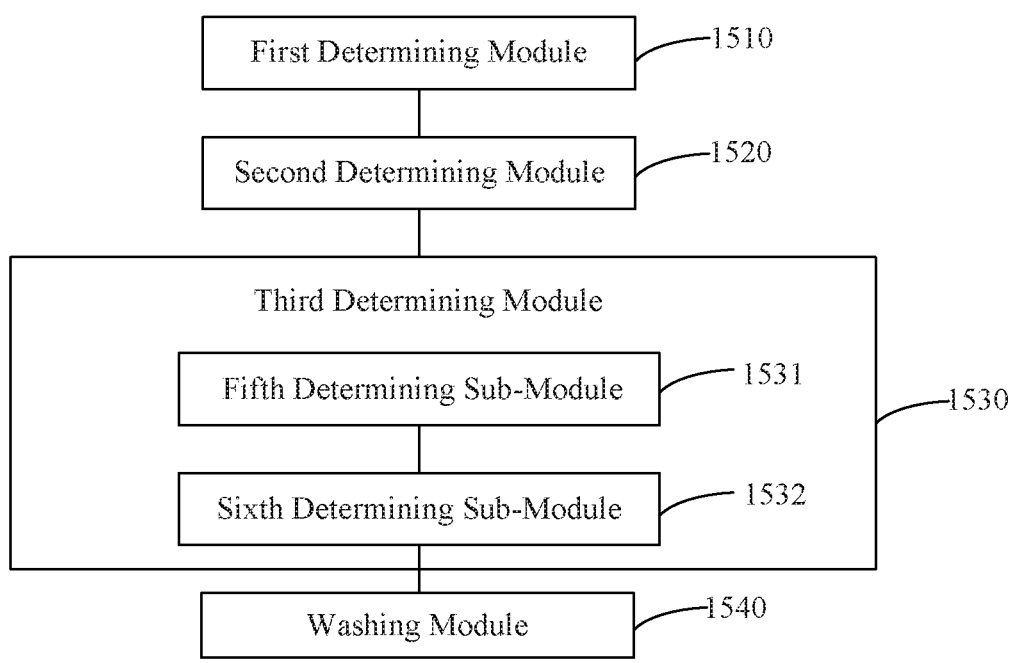
FIG. 15 is a block diagram of an intelligent laundry device, according to an exemplary embodiment.

FIG. 15 is a block diagram of an intelligent laundry device 1500, according to an exemplary embodiment. As shown in FIG. 15, the intelligent laundry device 1500 includes a first determining module 1510, a second determining module 1520, a third determining module 1530, and a washing module 1540, similar to the first determining module 610, the second determining module 620, the third determining module 630, and the washing module 640, respectively (FIG. 6). Additionally, the third determining module 1530 includes a fifth determining sub-module 1531 and a sixth determining sub-module 1532.

The fifth determining sub-module 1531 is configured to determine that the washing parameters include a third rotating speed, a third washing cycle duration, and a third number of rinse cycles, when the material of the clothes to be cleaned includes silk and/or wool.

The sixth determining sub-module 1532 is configured to determine that the washing parameters include a fourth rotating speed, a fourth washing cycle duration, and a fourth number of rinse cycles, when the material of the clothes to be cleaned includes cotton. Here, the third rotating speed is higher than the fourth rotating speed. The third washing cycle duration is longer than the fourth washing cycle duration. The third number of rinse cycles is greater than the fourth number of rinse cycles.

Figure 16:
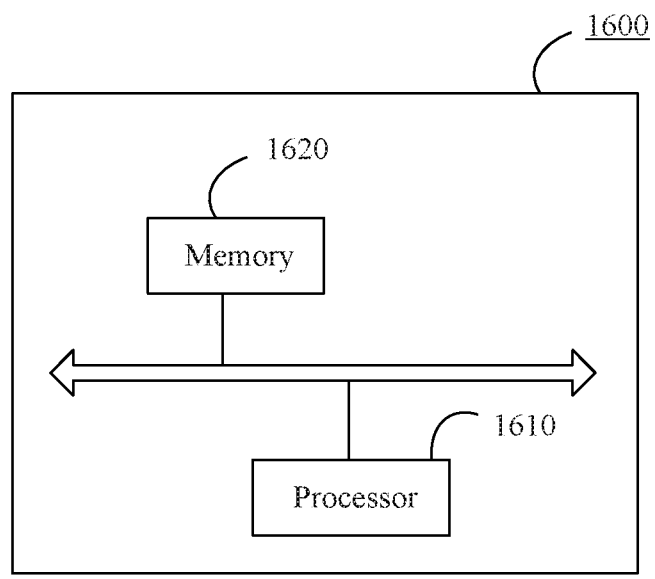
FIG. 16 is a block diagram of an intelligent laundry device, according to an exemplary embodiment.

FIG. 16 is a block diagram of an intelligent laundry device 1600, according to an exemplary embodiment. As shown in FIG. 16, the intelligent laundry device 1600 includes a processor 1610 and a memory 1620. The memory 1620 is configured to store instructions executable by the processor 1610. The memory 1620 is connected to and communicates with the processor 1610 through a system bus. The processor 1610 is configured to execute the instructions to: determine a current user of a washing machine; determine washing features of the user; determine washing parameters for a laundry according to the washing features; and control the washing machine to wash the laundry according to the washing parameters.

In the disclosed embodiments, it is to be understood that, the processor 1610 may be a central processing unit (CPU), a general purpose processor, a digital signal processor (DSP), and/or an application specific integrated circuit (ASIC). The general purpose processor can be either a microprocessor or any other conventional processor. The memory 1620 may be a read-only memory (ROM), a random access memory (RAM), a flash memory, a hard disk, or a solid state disk. The methods disclosed in embodiments of the present disclosure can be directly executed by computer hardware, or can be executed by the combination of computer hardware and software.

Other embodiments of the present application will be apparent to those skilled in the art from consideration of the specification and practice of the present disclosure disclosed here. This application is intended to cover any variations, uses, or adaptations of the present application following the general principles thereof and including such departures from the present disclosure as come within known or customary practice in the art. It is intended that the specification and examples be considered as exemplary only, with a true scope and spirit of the present application being indicated by the following claims.

It is to be understood that, the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. An intelligent laundry method, comprising:
   determining a current user of a washing machine;
   determining washing features of the current user;
   determining washing parameters for a laundry according to the washing features; and
   controlling the washing machine to wash the laundry according to the washing parameters,
   wherein determining the current user of the washing machine includes at least one of:
   determining the current user of the washing machine according to login information used by the current user to log into the washing machine;
   obtaining users accessing a home area network, and determining the current user of the washing machine based on the users accessing the home area network; or
   determining users permitted to use the washing machine according to image data generated by a camera, and determining the current user of the washing machine based on the users permitted to use the washing machine.

2. The method according to claim 1, wherein the washing features of the current user include one or more of a laundry duration, a quantity of the laundry, a weight of the laundry, a type of clothes to be cleaned, material of the clothes to be cleaned, a degree of dirtiness of the clothes to be cleaned, or a cleanliness requirement of the laundry.

3. The method according to claim 2, wherein when the washing features include a laundry duration, a quantity of the laundry, and a weight of the laundry, determining the washing parameters for the laundry according to the washing features comprises:
   determining whether the laundry duration, the quantity of the laundry, and the weight of the laundry satisfy a first condition, wherein the first condition is satisfied when the laundry duration is longer than a first threshold, the quantity of the laundry is more than a second threshold, and the weight of the laundry is higher than a third threshold;

when it is determined that the laundry duration, the quantity of the laundry, and the weight of the laundry satisfy the first condition, determining that the washing parameters include a first rotating speed of the washing machine, a first washing cycle duration, and a first number of rinse cycles;

when it is determined that the laundry duration, the quantity of the laundry, and the weight of the laundry do not satisfy the first condition, determining that the washing parameters include a second rotating speed of the washing machine, a second washing cycle duration, and a second number of rinse cycles, wherein the first rotating speed is higher than the second rotating speed, the first washing cycle duration is longer than the second washing cycle duration, and the first number of rinse cycles is greater than the second number of rinse cycles.

4. The method according to claim 2, wherein when the washing features include material of the clothes to be cleaned, determining the washing parameters of the laundry according to the washing features comprises:

when it is determined that the material of the clothes to be cleaned includes silk or wool, determining that the washing parameters include a first rotating speed of the washing machine, a first washing cycle duration, and a first number of rinse cycles;

when it is determined that the material of the clothes to be cleaned includes cotton, determining that the washing parameters include a second rotating speed of the washing machine, a second washing cycle duration, and a second number of rinse cycles, wherein the first rotating speed is higher than the second rotating speed, the first washing cycle duration is longer than the second washing cycle duration, and the first number of rinse cycles is greater than the second number of rinse cycles.

5. The method according to claim 1, wherein the washing parameters include a rotating speed of the washing machine, a washing cycle duration, and a number of rinse cycles.

6. The method according to claim 1, wherein determining the washing features of the current user comprises:

when the current user has used the washing machine previously, generating the washing features of the current user according to washing records of the current user.

7. The method according to claim 1, wherein determining the washing features of the current user comprises:

determining an age and a gender of the current user when the current user is a new user of the washing machine; and determining the washing features of the current user according to the age and gender of the current user.

8. The method according to claim 1, wherein determining the washing features of the current user comprises:

when the current user is a new user, generating the washing features of the current user according to washing records of one or more family members of the current user.

9. The method according to claim 1, wherein determining the washing features of the current user comprises:

detecting a quantity, a weight, material, and a degree of dirtiness of clothes to be cleaned; and determining the washing features of the current user according to the quantity, the weight, the material, and the degree of dirtiness.

10. An intelligent laundry device, comprising:
a processor; and
a memory configured to store instructions executable by the processor;
wherein the processor is configured to:
determine a current user of a washing machine;
determine washing features of the current user;
determine washing parameters for a laundry according to the washing features; and
control the washing machine to wash the laundry according to the washing parameters,
wherein the processor is configured to determine the current user of the washing machine by at least one of:
determining the current user of the washing machine according to login information used by the current user to log into the washing machine;
obtaining users accessing a home area network, and determining the current user of the washing machine based on the users accessing the home area network; or
determining users permitted to use the washing machine according to image data generated by a camera, and determining the current user of the washing machine based on the users permitted to use the washing machine.

11. The device according to claim 10, wherein the washing features of the current user include one or more of a laundry duration, a quantity of the laundry, a weight of the laundry, a type of clothes to be cleaned, material of the clothes to be cleaned, a degree of dirtiness of the clothes to be cleaned, or a cleanliness requirement of the laundry.

12. The device according to claim 11, wherein when the washing features include a laundry duration, a quantity of the laundry, and a weight of the laundry, the processor is further configured to:

determine whether the laundry duration, the quantity of the laundry, and the weight of the laundry satisfy a first condition, wherein the first condition is satisfied when the laundry duration is longer than a first threshold, the quantity of the laundry is more than a second threshold, and the weight of the laundry is higher than a third threshold;

when it is determined that the laundry duration, the quantity of the laundry, and the weight of the laundry satisfy the first condition, determine that the washing parameters include a first rotating speed of the washing machine, a first washing cycle duration, and a first number of rinse cycles;

when it is determined that the laundry duration, the quantity of the laundry, and the weight of the laundry do not satisfy the first condition, determine that the washing parameters include a second rotating speed of the washing machine, a second washing cycle duration, and a second number of rinse cycles, wherein the first rotating speed is higher than the second rotating speed, the first washing cycle duration is longer than the second washing cycle duration, and the first number of rinse cycles is greater than the second number of rinse cycles.

13. The device according to claim 11, wherein when the washing features include material of the clothes to be cleaned, the processor is further configured to:

when it is determined that the material of the clothes to be cleaned includes silk or wool, determine that the washing parameters include a first rotating speed of the washing machine, a first washing cycle duration, and a first number of rinse cycles;

when it is determined that the material of the clothes to be cleaned includes cotton, determine that the washing parameters include a second rotating speed of the washing machine, a second washing cycle duration, and a second number of rinse cycles, wherein the first rotating speed is higher than the second rotating speed, the first washing cycle duration is longer than the second washing cycle duration, and the first number of rinse cycles is greater than the second number of rinse cycles.

14. The device according to claim 10, wherein the washing parameters include a rotating speed of the washing machine, a washing cycle duration, and a number of rinse cycles.

15. The device according to claim 10, wherein the processor is further configured to:
when the current user has used the washing machine previously, generate the washing features of the current user according to washing records of the current user.

16. The device according to claim 10, wherein the processor is further configured to:
obtain an age and a gender of the current user when the current user is a new user; and
determine the washing features of the current user according to the age and gender of the current user.

17. The device according to claim 10, wherein the processor is further configured to:
when the user is a new user, generate the washing features of the current user according to washing records of one or more family members of the current user.

18. The device according to claim 10, wherein the processor is further configured to:
detect a quantity, a weight, material, and a degree of dirtiness of clothes to be cleaned; and
determine the washing features of the current user according to the quantity, the weight, the material, and the degree of dirtiness.

* * * * *